US009047126B2

(12) United States Patent
Anaya et al.

(10) Patent No.: US 9,047,126 B2
(45) Date of Patent: Jun. 2, 2015

(54) CONTINUOUS AVAILABILITY BETWEEN SITES AT UNLIMITED DISTANCES

(75) Inventors: Jaime F. Anaya, San Jose, CA (US); Paul M. Cadarette, Hemet, CA (US); Michael G. Fitzpatrick, Raleigh, NC (US); David B. Petersen, Great Falls, VA (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 13/081,078

(22) Filed: Apr. 6, 2011

(65) Prior Publication Data

US 2012/0259968 A1 Oct. 11, 2012

(51) Int. Cl.
*G06F 15/173* (2006.01)
*G06F 9/50* (2006.01)

(52) U.S. Cl.
CPC .............. *G06F 9/5044* (2013.01); *G06F 9/505* (2013.01)

(58) Field of Classification Search
USPC .................................................. 709/223, 224
See application file for complete search history.

(56) References Cited

U.S. PATENT DOCUMENTS

| 6,122,630 | A | 9/2000 | Strickler et al. | |
|---|---|---|---|---|
| 6,865,601 | B1 | 3/2005 | Cherkasova et al. | |
| 7,350,186 | B2 | 3/2008 | Coleman et al. | |
| 7,636,916 | B2* | 12/2009 | Bello et al. | 718/104 |
| 7,702,791 | B2* | 4/2010 | Halpern et al. | 709/227 |
| 2002/0091854 | A1 | 7/2002 | Smith | |
| 2004/0133591 | A1 | 7/2004 | Holenstein et al. | |
| 2006/0106922 | A1* | 5/2006 | Arregoces et al. | 709/223 |
| 2006/0200501 | A1 | 9/2006 | Holenstein et al. | |
| 2007/0143365 | A1* | 6/2007 | D'Souza et al. | 707/203 |
| 2007/0255766 | A1* | 11/2007 | Di Giglio et al. | 707/204 |
| 2009/0307166 | A1* | 12/2009 | Routray et al. | 706/46 |
| 2011/0099146 | A1 | 4/2011 | McAlister et al. | |
| 2013/0007503 | A1 | 1/2013 | Anaya et al. | |
| 2013/0117455 | A1* | 5/2013 | Shabtay et al. | 709/227 |
| 2013/0318221 | A1 | 11/2013 | Anaya et al. | |
| 2014/0108662 | A1 | 4/2014 | Anaya et al. | |

OTHER PUBLICATIONS

Titled: "FLEX: Load Balancing and Management Strategy for Scalable Web Hosting Service", Ludmila Cherkasova, HewlettoPackard Labs, 1501 Page Mill Road, Palo Alto, Ca 94303, USA, (hereinafter FLEX).*

(Continued)

*Primary Examiner* — Brian Roberts
*Assistant Examiner* — Shah R Zaman
(74) *Attorney, Agent, or Firm* — Cantor Colburn LLP; William A. Kinnaman, Jr.

(57) ABSTRACT

A continuous availability system including a controller module executing on a computer processor, the system is configured to receive a unit of work and to select a primary site from a plurality of sites to process the unit of work. Once a site is selected the system is further configured to select one of one or more processing systems from the primary site to process the unit of work. The system is additionally configured to replicate the unit of work to at least one other site once the unit of work is completed at the primary site. The system is configured to operate even when the primary site is separated from each of the plurality of sites by a distance greater than a metropolitan area network and the operations occur within a customer acceptability window.

16 Claims, 5 Drawing Sheets

(56) References Cited

OTHER PUBLICATIONS

IBM, "A device to measure the efficiency and productivity of service operation and to estimate the workload or amount of service that is required for planned amount of the service or give workload respectively" IP.com, Jun. 18, 2003, pp. 1-4.
Cherkasova, Ludmila, "FLEX: Load Balancing and Management Strategy for Scalable Web Hosting Service", IEEE, 2000, p. 8-13.
IBM, "Triggering migration of critical workload on availability-affecting event with workload prioritization", IP.com, Jul. 14, 2009, pp. 1-3.
U.S. Appl. No. 13/173,071, filed Jun. 30, 2011, unpublished.
U.S. Appl. No. 13/477,323, filed May 22, 2012, unpublished.
Final Office Action for U.S. Appl. No. 13/173,071, mailed Oct. 24, 2013, 41 pages.
Non Final Office Action for U.S. Appl. No. 13/173,071, mailed Mar. 10, 2014, 15 pages.
Non Final Office Action for U.S. Appl. No. 13/173,071, mailed Apr. 4, 2013, 59 pages.
Continuity Central, [online]; [retrieved on Apr. 7, 2014]; retireved from the Internet http://www.continuitycentral.com/feature0358.htm Continuity Central, "Business Continuity Unwrapped . . . ," 2010, pp. 1-5.
Rob Dearborn, et al., "The Costs of Downtime: North American Medium Businesses 2006," Infonetics Research, Mar. 2006, pp. 1-41.
J. Gantz, et al., "The Expanding Digital Universe: A Forecast of Worldwide Information Growth Through 2010," An IDC White Paper, EMC, IDC, Mar. 2007, pp. 1-24.

* cited by examiner

CONTINUOUS AVAILABILITY BETWEEN SITES AT UNLIMITED DISTANCES

BACKGROUND

The present invention relates generally to continuous availability between sites at unlimited distances.

Existing continuous availability and disaster recovery solutions are limited by a number of factors. Continuous availability protects against data loss, but is limited to a maximum amount of distance between sites. Existing solutions support a maximum distance that is considered too limited for many customer environments.

Disaster recovery solutions provide unlimited distance between sites with minimal data loss, but require starting systems, applications, and their supporting infrastructure on the backup site, which may take several hours.

Both disaster recovery and continuous availability systems additionally require modifications to software applications, such as database servers, and hardware, such as routers and switches, in order to implement the various disaster recovery and continuous availability functions, and therefore require additional cost, and reconfiguration in order to implement.

SUMMARY

An embodiment includes a continuous availability system. The continuous availability system includes a controller module executing on a computer processor, the system configured to receive a unit of work and select a primary site from a plurality of sites to process the unit of work. Once a site is selected the system is further configured to select one of one or more processing systems from the primary site to process the unit of work. The system is additionally configured to replicate the unit of work to at least one other site once the unit of work is completed at the primary site. The system is configured to operate even when the primary site is separated from each of the plurality of sites by a distance greater than a metropolitan area network and the operations occur within a customer acceptability window.

Another embodiment is a method of performing continuous availability over long distances. The method includes receiving a unit of work and selecting a primary site from a plurality of sites to process the unit of work. Once a site is selected one of one or more processing systems from the primary site is selected to process the unit of work. The method additionally replicates the unit of work to at least one other site once the unit of work is completed at the primary site. The method operates effectively even when the primary site is separated from each of the plurality of sites by a distance greater than a metropolitan area network and the operations occur within a customer acceptability window.

Yet another embodiment is a computer program product for continuous availability over long distances. The computer program product includes a tangible storage medium readable by a processing circuit and storing instructions for execution by the processing circuit. The instructions perform a method, which includes receiving a unit of work and selecting a primary site from a plurality of sites to process the unit of work. Once a site is selected one of one or more processing systems from the primary site is selected to process the unit of work. The method additionally replicates the unit of work to at least one other site once the unit of work is completed at the primary site. The method operates effectively even when the primary site is separated from each of the plurality of sites by a distance greater than a metropolitan area network and the operations occur within a customer acceptability window.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
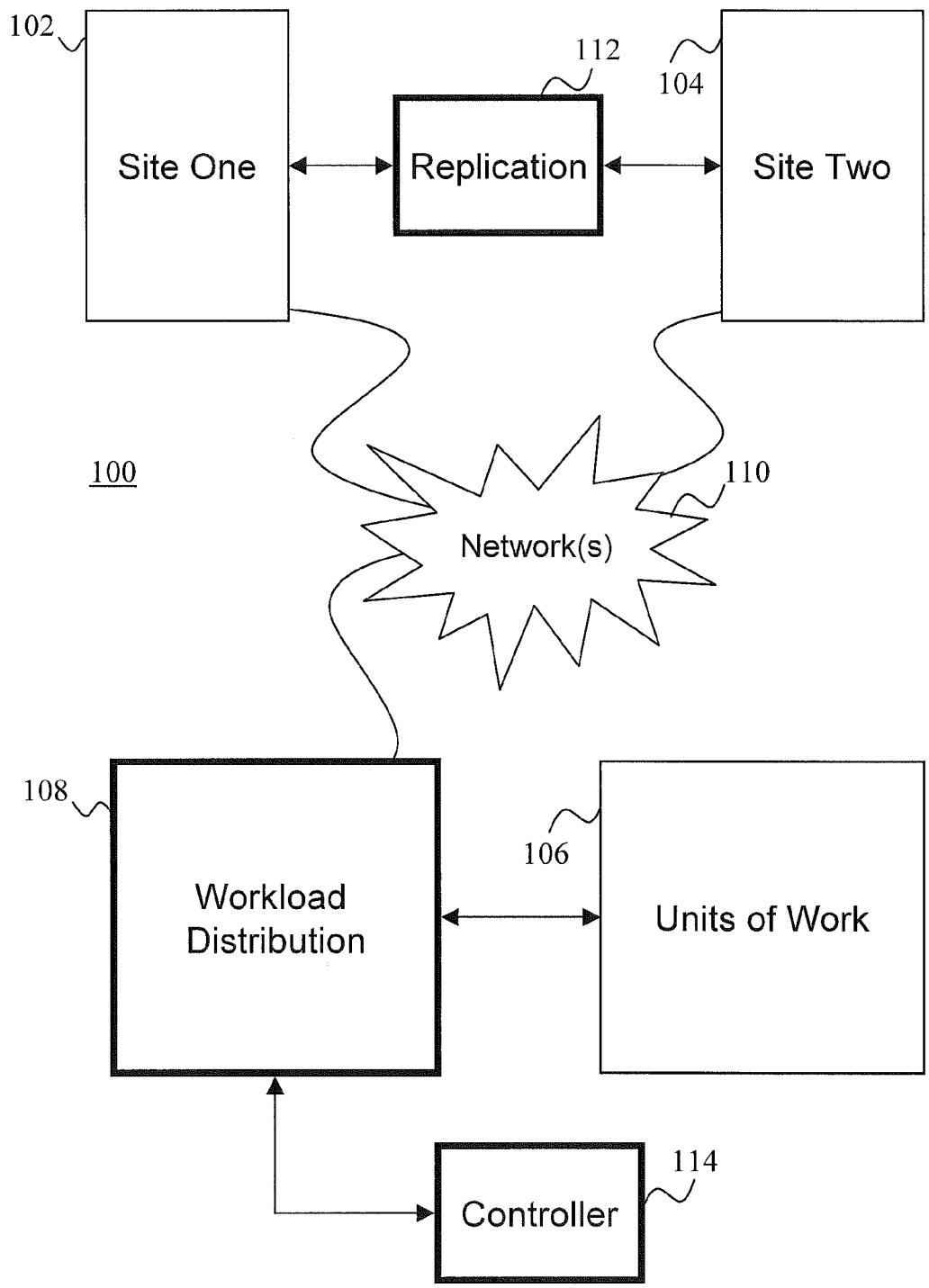
FIG. 1 illustrates a block diagram of a system for continuous availability across multiple sites at unlimited distances in an embodiment.

An embodiment includes a long distance continuous available system for providing continuous availability, disaster recovery, workload distribution and replication of application data across a plurality of sites at unlimited distances. The long distance continuous available system includes replication modules, which provides unit of work based replication across all of the plurality of sites. A unit of work is one or more transactions and/or processes performed as a group to service one or more requests. In an embodiment the long distance continuous availability system provides continuous availability, workload distribution, and replication services for individual sites separated by an unlimited geographic area with instant fail over, and a nearly instant recovery point, all without requiring modification to existing user applications.

In an embodiment, the long distance continuous availability system includes a workload distribution module that collects a plurality of metrics at the software application, middleware, operating system, network, and hardware level and uses the collected metrics to provide disaster recovery and fail over capabilities across the plurality of sites.

In an embodiment, the long distance continuous availability system includes a controller, which integrates the various continuous availability, disaster recovery, replication, and workload distribution components of the system.

Existing continuous availability applications are limited geographically and/or by recovery time. When a workload is spread across multiple servers in a single location, those servers often share a single data repository and therefore all data related to the workload is stored in the same location. When the workload is split among different data centers, a single data repository is not always feasible. In these instances, data from the workload is stored in data repositories at each site, and the data is synchronized, bit-by-bit, between the databases at each site. The time that it takes to synchronize the databases is called latency. As sites are spread further apart geographically, latency increases because of the time it takes to move the data over a network in order to synchronize it. Once latency increases beyond a relatively small amount of time, data between data centers takes increasingly longer periods of time to achieve synchronization. Therefore, continuous availability systems provide acceptable workload performance only over a limited geographic area. This limited geographic area is generally 10 to 20 fiber kilometers (i.e. over 10 to 20 linear kilometers of a fiber optic network.)

Disaster recovery systems are designed to switch between a primary and backup data center in situations where the primary data center experiences an outage. All transactions are distributed to the primary data center and the data is replicated bit-by-bit to the secondary site or sites. Disaster recovery systems are designed to meet a certain recovery time objective (RTO) and recovery point objective (RPO). An RTO is the maximum amount of timed needed to begin normal operations after the primary site experiences an outage. Because the backup site is configured to receive replication data from the primary site, when the primary system goes down, causing the applications to fail over to the backup site, a number of systems must be restarted at the backup site before all of the shared services are released. Therefore, the minimum RTO is the amount of time that is needed to restart the various services. This may be nearly an hour under ideal conditions. An RPO is the unit of time up to which the back up site is current after the primary data center becomes unavailable. As data is stored at the primary site, it is continuously replicated to the backup site. When the primary site goes down, any data that has not been replicated may be lost. The longer it takes to replicate the data, the longer the minimum RPO.

Clients require continuous availability and disaster recovery systems to be separated by longer distances than are currently supported. In order for continuous availability and disaster recovery systems to be considered viable at long distances, the systems must perform between sites separated by large distances, and also operate within a customer acceptability window. In an embodiment, the distance between sites includes distances greater than the area covered within a metro area network (MAN.) A MAN is a network that consists of a distance measured in tens of kilometers up to 20 fiber kilometers. Customers require that their primary and one or more fail over sites be separated by distances large enough to ensure that a disaster that affects one site will not affect the others. Although these distances vary based on regional and environmental conditions, distances larger than a MAN often separate the sites. In an embodiment, the customer acceptability window is measured by the length of the RPO. In an embodiment, the customer acceptably window an RPO of less than 3 seconds of data.

Turning now to FIG. 1, a system 100 for implementing continuous availability across multiple sites at unlimited distances will now be described. In an embodiment, the system includes one or more workload distribution modules 108 executing computer instructions for continuous availability across multiple sites at unlimited distances. The one or more workload distribution modules 108 may operate in any type of environment that is capable of executing a software application. One or more workload distribution modules 108 may include a high-speed computer processing device, such as a mainframe computer, to manage the volume of operations governed by an entity for which a continuous availability across multiple sites at unlimited distances process is executing. In an embodiment, the one or more workload distribution modules 108 are part of an enterprise (e.g., a commercial business) that implements the continuous availability across multiple sites at unlimited distances.

In an embodiment, the system depicted in FIG. 1 includes one or more sites such as site one 102 and site two 104. Each of the sites includes one or more systems executing one or more applications for a workload. The one or more applications include transaction processing applications, database applications, queue and queue management operations. Each of the sites includes one or more network hardware devices and/or software for managing and distributing network traffic among the one or more systems.

In an embodiment, the system depicted in FIG. 1 additionally includes a replication module 112. The replication module 112 replicates data between site one 102 and site two 104 and will be described in more detail below. In an embodiment, the system depicted in FIG. 1 further includes a controller module 114. The controller module 114 controls the operation of various components such as the one or more workload distribution modules 108 as is described in more detail below.

The workload distribution modules 108 and the sites (102 and 104) are communicatively coupled via one or more networks 110. The networks 110 may be any type of known network including, but not limited to, a wide area network (WAN), a local area network (LAN), a global network (e.g., Internet), a virtual private network (VPN), an intranet and a telephone network. The networks 110 may be implemented using a wireless network or any kind of physical network implementation known in the art. The sites such as site one 102 and site two 104 may be coupled to the one or more workload distribution modules 108 through multiple networks (e.g., intranet and Internet) so that not all of the sites are coupled to the one or more workload distribution modules 108 through the same network.

The one or more workload distribution modules 108 depicted in the system of FIG. 1 may be implemented using one or more servers operating in response to a computer program stored in a storage medium accessible by the server.

In an embodiment, units of work 106 are distributed to one or more of the sites through the one or more workload distribution modules 108. In an embodiment, users of the various systems executing at the one or more sites initiate the units of work 106. In an embodiment, the units of work 106 are transmitted from systems outside of the sites site one 102 and site two 104 and are processed by applications within one or more of the sites.

It will be understood that the execution of the continuous availability across multiple sites at unlimited distances and methods described in FIG. 1 may be implemented as modules in hardware, software executing on general-purpose hardware, or a combination thereof. Although only two sites are depicted in FIG. 1, it will be understood that the number of sites in FIG. 1 is limited for clarity and that, in an embodiment, any number of sites may be implemented. In addition, in embodiments, any geographic distance may separate the sites. Furthermore, although the one or more workload distribution modules 108 are depicted as existing outside of the sites, it will be understood that, in an embodiment, the one or more workload distribution modules 108 may be located in one or more of the sites directly.

Figure 2:
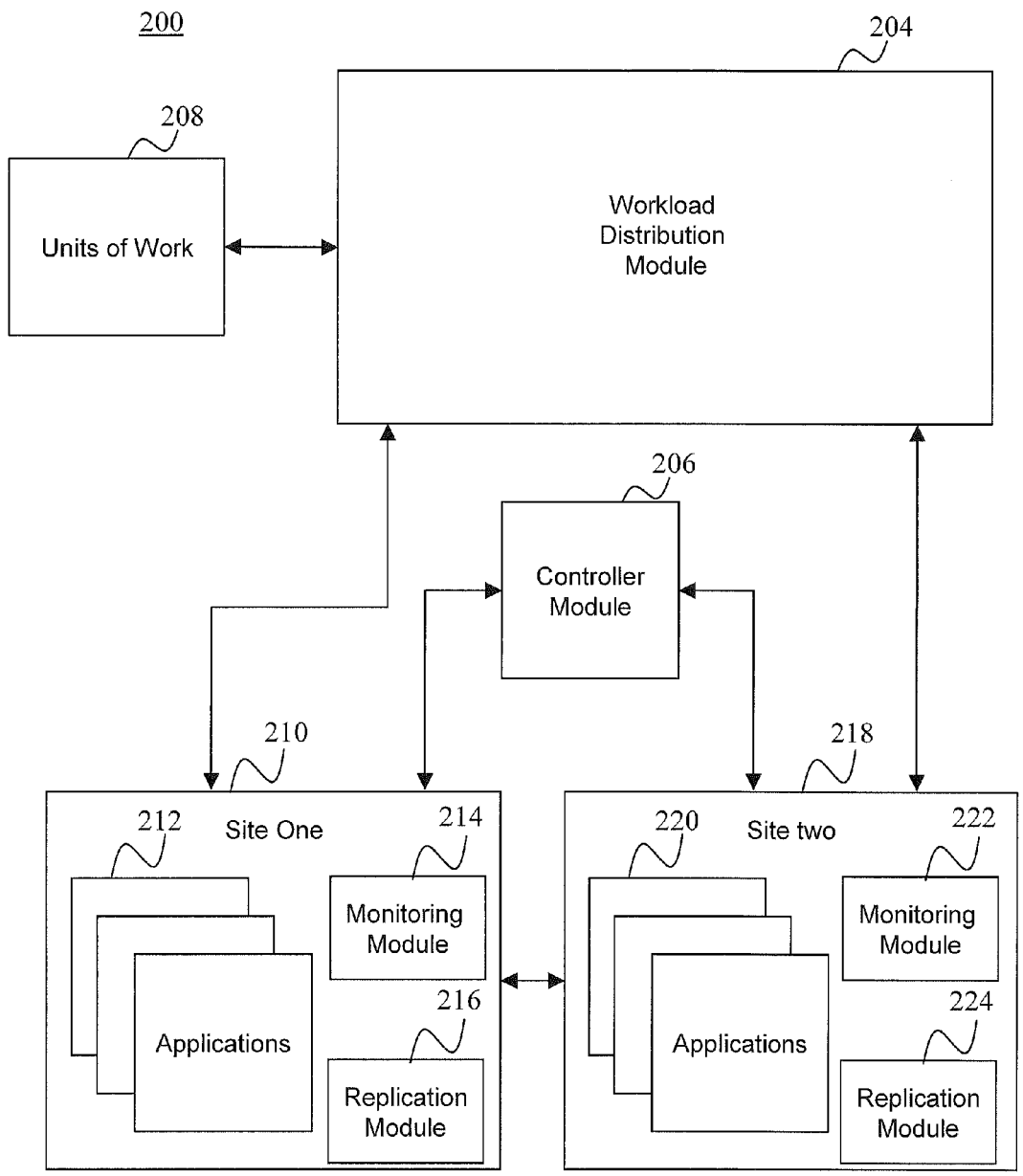
FIG. 2 illustrates a block diagram of the various components in a system for continuous availability across multiple sites at unlimited distances in accordance with an embodiment.

FIG. 2 illustrates a block diagram of the various components in a system for continuous availability across multiple sites at unlimited distances in accordance with an embodiment. A long distance continuous availability module 200 includes a workload distribution module 204. In an embodiment, the workload distribution module 204 collects metrics from each of site one 210 and site two 218. The metrics collected include processor speed, pending transactions, transaction execution time, system availability, network bandwidth utilization and availability, and any other performance-based metrics as is known in the art. In an embodiment, the workload distribution module 204 uses the metrics in order to distribute one or more units of work 208 to site one 210 and site two 212. In an embodiment, if the metrics indicate that one of the sites is overloaded, the workload distribution module 204 distributes units of work to the other site.

In an embodiment, the units of work are received at one of the sites. In an embodiment, site one 210 is a computer system executing one or more applications 212 for a workload. In an additional embodiment, site one 210 is a group of servers, such as a server farm, executing applications using local load balancing, or other methods of distributing load as is known in the art. In yet another embodiment, site one 210 includes a plurality of systems, each system executing one or more applications. In another embodiment, site one 210 includes a combination of servers and server farms each executing one or more applications. In an embodiment, site one 210 includes one or more monitoring modules, such as site one monitoring module 214. In an embodiment, the site one monitoring module 214 is communicatively coupled to the workload distribution module 204, such as through a network, and transmits metrics from the site one 210 to the workload distribution module 204. In an embodiment, the site one monitoring module 214 is executed on a single computer. In another embodiment, a monitoring module is executed on each of the systems executing at the site one 210. In yet another embodiment, a plurality of monitoring modules execute, one on each server, and report metrics to the workload distribution module 204. The site one monitoring module 214 is configured to monitor the systems executing at site one 210. In an embodiment, the site one monitoring module 214 is configured to monitor the available hardware processing capacity of the computer processors executing at the site one 210. In an embodiment, the site one monitoring module 214 is configured to monitor the available network capacity of the site one 210. In an embodiment, the site one monitoring module 214 is configured to monitor the one or more applications 212 executing at the site one 210. In an embodiment, the site one monitoring module 214 monitors various characteristics of the one or more applications 212 such as the number of queued transactions, the availability of the one or more applications 212 to handle additional transactions, the number of threads executing within each of the one or more applications 212, and any other application specific characteristics as is known in the art.

In an embodiment, site two 218 includes one or more applications 220, a site two monitoring module 222, and a site two replication module 224, configured identically to the site one 210. In an additional embodiment, site two 218 includes additional applications (not shown) that are not replicated or load balanced.

In an embodiment, each of the replication modules 216 and 224 are configured to replicate units of work between the sites, such as site one 210 and site two 218. In an embodiment, the replication modules 216 and 224 collect units of work at each of the sites, and coordinate the execution of those units of work on the other sites. In embodiments, any number of sites can be configured to provide load balancing and replication of units of work. In addition, although the controller module 206 is depicted as a stand-alone module, it will be understood that, in an embodiment, the controller module 206 may be executed in the long distance continuous availability module 200, or any of the sites.

In an embodiment, a controller module 206 is in communication with each of the sites, such as site one 210 and site two 218 and is configured to coordinate transactions and replication of the units of work between the various sites. In an embodiment, the controller module 206 is in communication with the workload distribution module 204, and uses information provided by each of those modules to coordinate transactions and replication of the units of work between the various sites. In an embodiment, long distance continuous availability module 200 includes the controller module 206.

The illustration of FIG. 2 is a simplified representation of the various components of the long distance continuous availability module 200 for purposes of clarity. It will be understood by those of ordinary skill in the art, that additional or fewer components may be used in alternate embodiments. In additional embodiments, the layout and configuration of the components may differ from those of FIG. 2 without affecting the functionality of the long distance continuous availability module 200. In additional embodiment, the various components may be located in separate modules. In further embodiments, the functionality of various components may be incorporated into a single hardware or software module.

Figure 3:
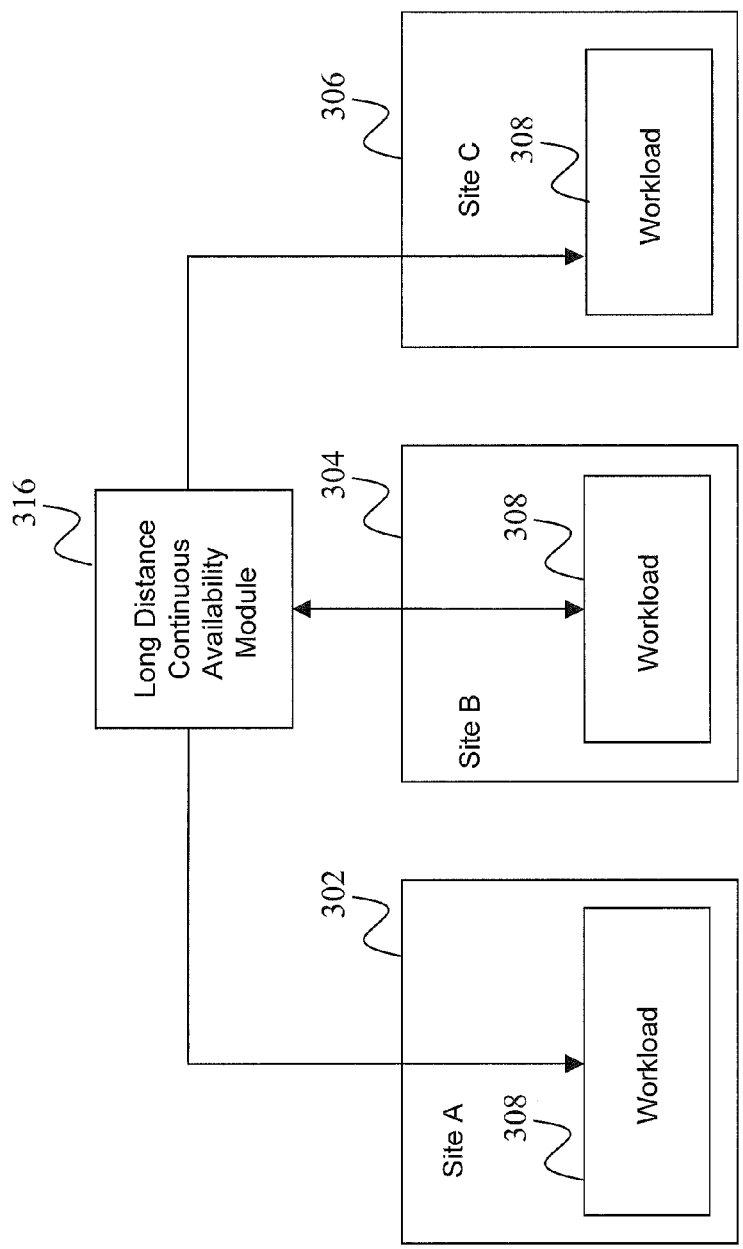
FIG. 3 is a block diagram that illustrates a simplified multi-site, multi-application workload in a long distance continuous availability system in an embodiment.

FIG. 3 is a block diagram that illustrates a simplified multi-site, multi-application, long distance continuous availability system in an embodiment. In an embodiment, the sites, Site A 302, Site B 304 and Site C 306 executes one or more applications for processing a workload. The applications generate and/or consume a workload 308. The workload 308 is provided with continuous availability, and fail over provisions by a long distance continuous availability module 316. In an embodiment, the long distance continuous availability module 316 is in communication with the various sites via a network, such as the one or more networks 110 of FIG. 1. In an embodiment, the long distance continuous availability module 316 is configured to detect that a primary site is down and automatically fails over (i.e. transmits future workloads) to one of the other sites. In an embodiment fail over occurs because of an unplanned outage and is based on metrics received by a workload distribution module from a monitoring module, such as the site one monitoring module 214 of FIG. 2. In an embodiment, the fail over occurs because of a planned outage and is initiated by a script and/or instructions from an operator. In an embodiment, the long distance continuous availability module 316 fails back to the primary site automatically based on scripts and/or instructions from an operator. In yet another embodiment, the long distance continuous availability module 316 fails back to the primary site automatically when it detects that the primary site is available. In an embodiment, the long distance continuous availability module 316 includes a replication module, such as the replication module 112 of FIG. 1, a workload distribution module such as the one or more workload distribution modules 108 of FIG. 1, and a controller, such as controller module 114 of FIG. 1.

Figure 4:
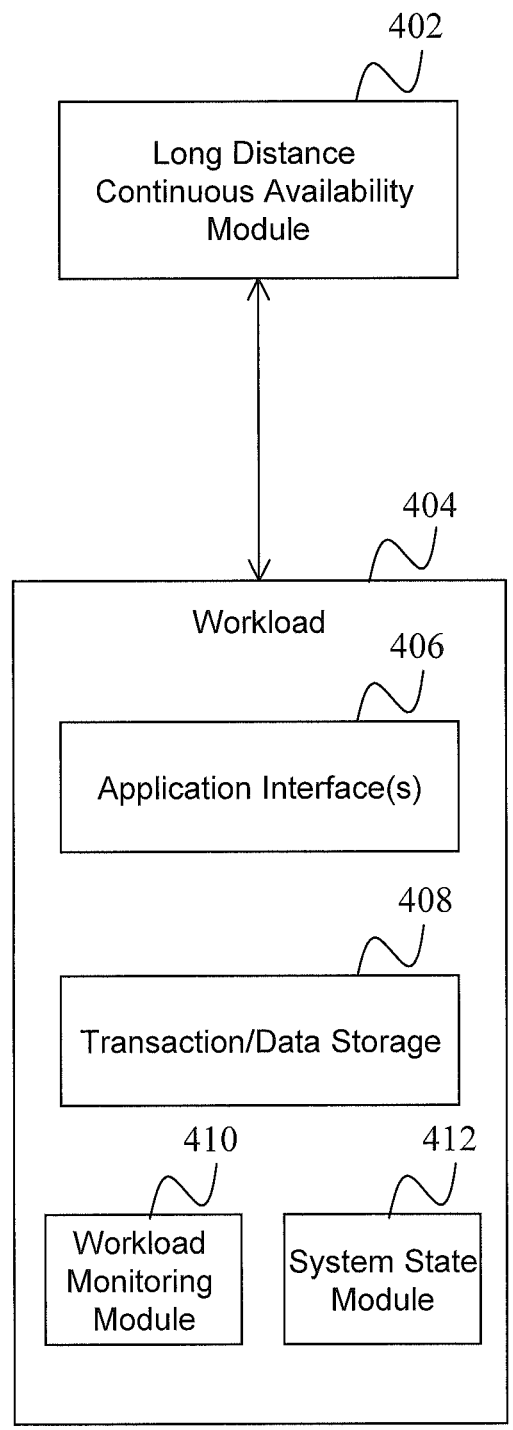
FIG. 4 illustrates a block diagram of an individual site implementation of the long distance continuous availability system in an embodiment.

FIG. 4 illustrates a block diagram of an individual site implementation of the long distance continuous availability system in an embodiment. The elements of FIG. 4 are executed on one or more sites such as site one 210 of FIG. 2. In an embodiment, long distance continuous availability module 402 is communicatively coupled to one or more applications executing at a site. The long distance continuous availability module 402 coordinates distribution of units of work to the workload 404. Workload 404 includes an application interface 406. The application interface 406 facilitates communication of units of work to the workload 404. The application interface 406 is configured to use any application interfaces such as TCP/IP, message queuing, remote procedure execution, or any other interface as is known in the art. The workload 404 additionally includes a transaction and data storage 408. In an embodiment, the transaction and data storage 408 is a database storage system. In an additional embodiment, the transaction and data storage 408 is a file based system. In yet another embodiment, the transaction and data storage 408 is a transaction-based storage such as a queue. In yet another embodiment, the transaction and data storage 408 may be any storage as is known in the art.

In an embodiment, the workload 404 additionally includes a workload monitoring module 410. In an embodiment, the workload monitoring module 410 monitors the system's processing load. In an embodiment, the workload monitoring module 410 is configured to determine the transaction processing speed of the application, the number of threads executing on the application, the number of transactions queued for processing, and/or any other application processing related information. In an embodiment, the workload monitoring module 410 is communicatively coupled to a monitoring module, such as the site one monitoring module 214 of FIG. 2, which transmits the application metrics to the workload distribution module 204.

In an embodiment, the workload 404 further includes a system state monitor 412. The system state monitor 412 communicates to the long distance continuous availability module 402 whether or not the workload 404 is currently operating within specified tolerances. When the workload 404 stops operating correctly, the system state monitor 412 notifies the long distance continuous availability module 402.

Figure 5:
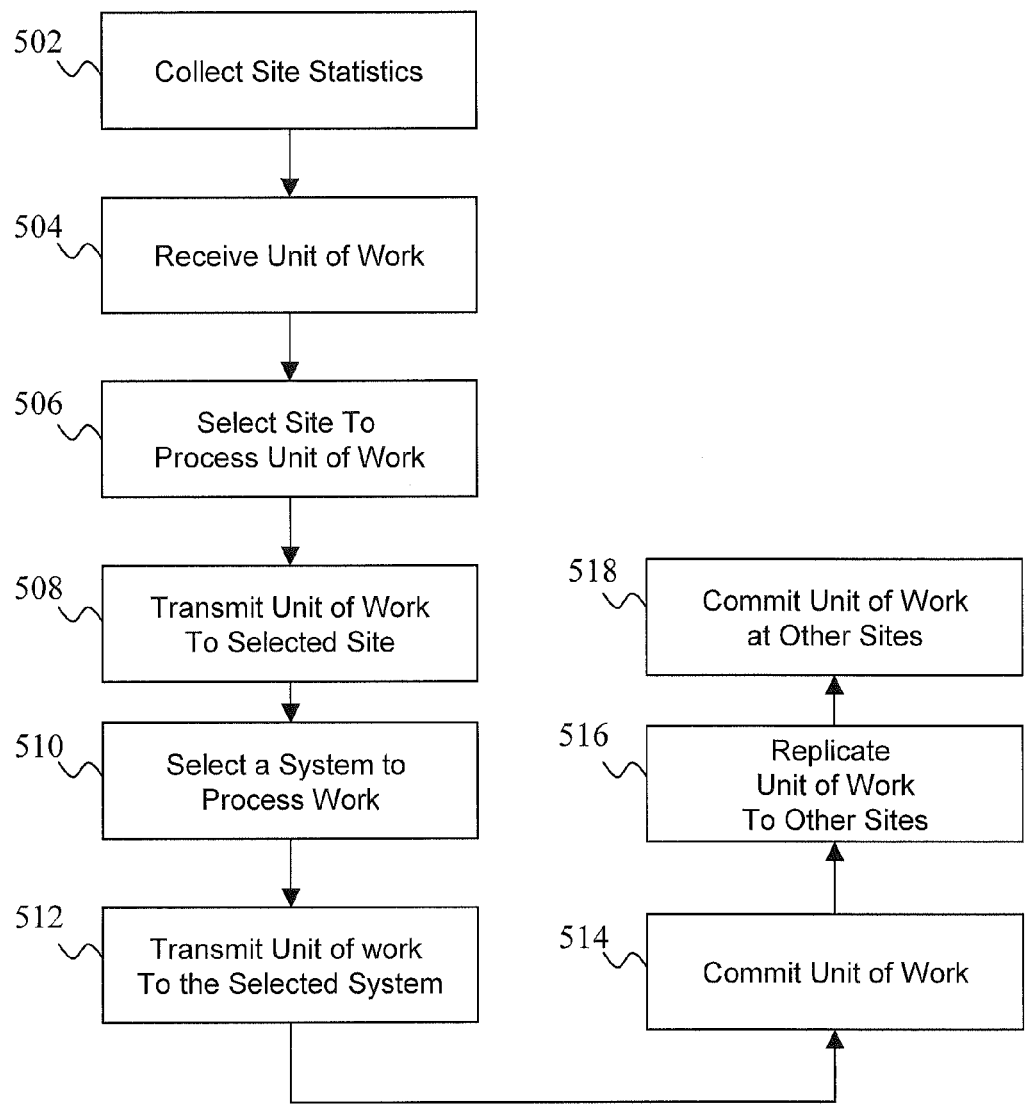
FIG. 5 illustrates a process flow for long distance continuous availability in an embodiment.

FIG. 5 illustrates a process flow for long distance continuous availability in an embodiment. In an embodiment the process flow of FIG. 5 is executed on the long distance continuous availability module 200 of FIG. 2. At block 502 statistics and metrics are collected from the various applications and sites. In an embodiment, the statistics and metrics are collected continuously. At block 504 a unit of work is received. A unit of work is one or more transactions that are connected with one another. In an embodiment, the unit of work may be a series of updates and/or inserts in a relational database and the unit of work is defined by a first transaction, and terminated by a commit request, which closes the group of transactions and stores them in a database. In another embodiment, a logical unit of work is a series of transactions across multiple backend systems, each dependent on one another.

At block 506 a workload distribution module, such as workload distribution module 204 of FIG. 2, uses the metrics collected at block 502 to determine which of a plurality of sites will be used to execute the unit of work. In an embodiment, the site is selected based on whether or not the site is executing an application that is targeted for executing the unit of work, on the available processing capacity, the available network bandwidth, the average transaction execution speed, the number of pending transactions, the availability of a site, and/or any other factor as is known in the art. In another embodiment, a site is selected iteratively in a "round-robin" fashion. In yet another embodiment, a site is selected randomly from a group of available sites.

In an embodiment, if one site is unavailable, such as where a network is made unavailable, a power outage is encountered, or a hardware failure exists, the site is automatically removed from consideration until the issues have been corrected.

At block 508, the unit of work is transmitted to the selected site. At block 510, a system within the site is selected to process the work. In an embodiment, a plurality of systems at each site may be configured to process a unit of work. At block 512, the unit of work is transmitted to the selected system. At block 514, the unit of work is executed by the selected system at the selected site, and the transactions in the unit of work are committed and stored in a database. At block 516, once the transactions have been executed, the unit of work is replicated to all of the other sites that support the same application environment using a replication module such as each of the replication modules 216 of FIG. 2. In an embodiment, the replication occurs asynchronously. In an additional embodiment, the replication occurs synchronously. In an embodiment, the unit of work is replicated in its entirety to each of the alternate sites. At block 518 each of the transactions in the unit of work is executed and committed by a replication module at each of the alternate sites in a way that maintains data consistency.

Technical effects and benefits include a mechanism for load balancing, fail over, and replication across a number of sites separated by unlimited distances without requiring application configuration.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:

1. A continuous availability system, comprising:
    a computer processor configured to:
    receive a unit of work;
    receive a plurality of metrics regarding each of a plurality of sites, the plurality of metrics for each site including:
        determining that the site is executing a processing system that is capable of executing the unit of work;
        available processing capacity;
        available network bandwidth;
        average transaction execution speed;
        a number of pending transactions; and
        availability of the site;
    select a primary site of a plurality of sites to process the unit of work based on the metrics for the plurality of sites;
    receive, from the primary site, for each processing system of a plurality of processing systems of the primary site, a plurality of metrics including:
        a number of queued transactions,
        availability of the processing system to handle additional transactions; and
        a number of threads executing within the processing system;
    select one of the plurality of processing systems of the primary site to process the unit of work based on the metrics for the plurality of processing systems of the primary site;
    replicate the unit of work to at least one other site responsive to completing the unit of work successfully; and
    automatically select a new primary site from the plurality of sites, and switch from the new primary site back to the primary site responsive to determining that the primary site is available after being unavailable based on a planned outage of the primary site;
    wherein the primary site is separated from each of the plurality of sites by a distance greater than a metropolitan area network (MAN) and operations occur within a customer acceptability window.

2. The system of claim 1, wherein the MAN is a distance greater than 20 fiber kilometers.

3. The system of claim 2, wherein the customer acceptability window is a recovery point objective of less than 3 seconds.

4. The system of claim 1, wherein the computer processor is configured to monitor the processing systems.

5. The system of claim 1, wherein the switching is initiated automatically.

6. The system of claim 1, wherein the computer processor is configured to replicate the unit of work by executing the unit of work at each of the plurality of sites and maintaining data consistency between the plurality of sites.

7. A method for providing continuous availability over long distances, the method comprising:
receiving, on a computer, a unit of work;
receiving, on the computer, a plurality of metrics regarding each of a plurality of sites, the plurality of metrics for each site including:
determining that the site is executing a processing system that is capable of executing the unit of work;
available processing capacity;
available network bandwidth;
average transaction execution speed;
a number of pending transactions; and
availability of the site;
selecting, on the computer, a primary site of a plurality of sites to process the unit of work based on the metrics for the plurality of sites;
receiving, from the primary site, for each processing system of a plurality of processing systems of the primary site, a plurality of metrics including:
a number of queued transactions, availability of the processing system to handle additional transactions; and
a number of threads executing within the processing system;
selecting, on the computer, one of the plurality of processing systems of the primary site to process the unit of work based on the metrics for the plurality of processing systems of the primary site;
replicating the unit of work to at least one other site responsive to completing the unit of work successfully; and
automatically selecting a new primary site from the plurality of sites, and switching from the new primary site back to the primary site responsive to determining that the primary site is available after being unavailable based on a planned outage of the primary site;
wherein the primary site is separated from each of the plurality of sites by a distance greater than a metropolitan area network (MAN) and operations occur within a customer acceptability window.

8. The method of claim 7, wherein the MAN is a distance greater than 20 fiber kilometers.

9. The method of claim 8, wherein the customer acceptability window is a recovery point objective of less than 3 seconds.

10. The method of claim 7, wherein the switching is initiated automatically.

11. The method of claim 7, wherein the replicating is performed by executing the unit of work at each of the plurality of sites and maintaining data consistency between the plurality of sites.

12. A computer program product for continuous availability over long distances, the computer program product comprising:
a non-transitory storage medium readable by a processing circuit and storing instructions for execution by the processing circuit for performing a method comprising:
receiving a unit of work;
receiving a plurality of metrics regarding each of a plurality of sites, the plurality of metrics for each site including:
determining that the site is executing a processing system that is capable of executing the unit of work;
available processing capacity;
available network bandwidth;
average transaction execution speed;
a number of pending transactions; and
availability of the site;
selecting a primary site of a plurality of sites to process the unit of work based on the metrics for the plurality of sites;
receiving, from the primary site, for each processing system of a plurality of processing systems of the primary site, a plurality of metrics including:
a number of queued transactions,
availability of the processing system to handle additional transactions; and
a number of threads executing within the processing system;
selecting one of the plurality of processing systems of the primary site to process the unit of work based on the metrics for the plurality of processing systems of the primary site;
replicating the unit of work to at least one other site responsive to completing the unit of work successfully; and
automatically selecting a new primary site from the plurality of sites and switching from the new primary site back to the primary site responsive to determining that the primary site is available after being unavailable based on a planned outage of the primary site;
wherein the primary site is separated from each of the plurality of sites by a distance greater than a metropolitan area network (MAN) and operations occur within a customer acceptability window.

13. The computer program product of claim 12, wherein the MAN is a distance greater than 20 fiber kilometers.

14. The computer program product of claim 13, wherein the customer acceptability window is a recovery point objective of less than 3 seconds.

15. The computer program product of claim 12, wherein the switching is initiated automatically.

16. The computer program product of claim 12, wherein the replicating is performed by executing the unit of work at each of the plurality of sites and maintaining data consistency between the plurality of sites.

* * * * *